US012650669B2

(12) United States Patent
Hein et al.

(10) Patent No.: US 12,650,669 B2
(45) Date of Patent: Jun. 9, 2026

(54) CONTROL DEVICE FOR CONTROLLING A TECHNICAL SYSTEM, AND METHOD FOR CONFIGURING THE CONTROL DEVICE

(71) Applicant: Siemens Aktiengesellschaft, Munich (DE)

(72) Inventors: Daniel Hein, Munich (DE); Marc Christian Weber, Munich (DE); Holger Schöner, Munich (DE); Steffen Udluft, Eichenau (DE); Volkmar Sterzing, Neubiberg (DE); Kai Heesche, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 268 days.

(21) Appl. No.: 18/272,990

(22) PCT Filed: Dec. 28, 2021

(86) PCT No.: PCT/EP2021/087697
§ 371 (c)(1),
(2) Date: Jul. 18, 2023

(87) PCT Pub. No.: WO2022/161729
PCT Pub. Date: Aug. 4, 2022

(65) Prior Publication Data
US 2024/0160159 A1      May 16, 2024

(30) Foreign Application Priority Data
Jan. 29, 2021      (EP) ..................................... 21154166

(51) Int. Cl.
G05B 13/02       (2006.01)
G06N 20/00       (2019.01)

(52) U.S. Cl.
CPC ......... *G05B 13/0265* (2013.01); *G06N 20/00* (2019.01)

(58) Field of Classification Search
None
See application file for complete search history.

(56) References Cited

U.S. PATENT DOCUMENTS 6,882,992 B1      4/2005   Werbos
2014/0277718 A1   9/2014   Izhikevich et al.
(Continued)

FOREIGN PATENT DOCUMENTS

CN        110503082 A      11/2019
CN        110678816 A      1/2020
(Continued)

OTHER PUBLICATIONS

PCT International Search Report mailed Mar. 31, 2019 corresponding to PCT International Application No. PCT/EP2021/087697 filed Dec. 28, 2021.

*Primary Examiner* — Sean Shechtman
(74) *Attorney, Agent, or Firm* — Schmeiser, Olsen & Watts, LLP

(57)      ABSTRACT

An operating signal is fed to a first machine learning module to reproduce a behavior signal of a technical system, the behavior signal occurring specifically without the current use of a control action and output the reproduced behavior signal as a first output signal. The first output signal is fed to a second machine learning module to reproduce a resulting behavior signal using a control action signal and output the reproduced behavior signal as a second output signal. Furthermore, an operating signal is fed to a third machine learning module, and a third output signal is fed to the trained second machine learning module. A control action performance ascertained using the second output signal, and the control action performance is used to train the third (Continued)

machine learning module to optimize the control action performance. By training the third machine learning module, a control device controls the technical system.

16 Claims, 3 Drawing Sheets

(56)                    References Cited

U.S. PATENT DOCUMENTS

| | | | |
|---|---|---|---|
| 2018/0373233 | A1 | 12/2018 | Goto |
| 2020/0006478 | A1 | 1/2020 | Hsu et al. |
| 2020/0192304 | A1 | 6/2020 | Hentschel et al. |
| 2021/0141985 | A1 | 5/2021 | Fischer et al. |
| 2021/0256428 | A1 | 8/2021 | Düll et al. |

FOREIGN PATENT DOCUMENTS

| | | | |
|---|---|---|---|
| CN | 111771202 | A | 10/2020 |
| DE | 102018004923 | A1 | 12/2018 |
| DE | 102018112771 | A1 | 12/2018 |
| DE | 102018216079 | A1 | 3/2020 |
| EP | 3588211 | A1 | 1/2020 |
| JP | 2019021186 | A | 2/2019 |
| JP | 2019175275 | A | 10/2019 |
| WO | 2020253933 | A1 | 12/2020 |

CONTROL DEVICE FOR CONTROLLING A TECHNICAL SYSTEM, AND METHOD FOR CONFIGURING THE CONTROL DEVICE

CROSS-REFERENCE TO RELATED APPLICATIONS

This application claims priority to PCT Application No. PCT/EP2021/087697, having a filing date of Dec. 28, 2021, which claims priority to EP Application No. 21154166.9, having a filing date of Jan. 29, 2021, the entire contents both of which are hereby incorporated by reference.

FIELD OF TECHNOLOGY

The following relates to a control device for controlling a technical system, and method for configuring the control device.

BACKGROUND

Machine learning methods are increasingly being used in the control of complex technical systems, such as for example gas turbines, wind turbines, combustion engines, robots, manufacturing installations or power grids. Using such learning methods, a machine learning model of a control device may be trained, on the basis of training data and proceeding from current operating signals of a technical system, to determine those control actions for controlling the technical system that specifically bring about a desired or optimized behavior of the technical system and thus optimize the performance thereof. Such a machine learning model for controlling a technical system is often also referred to as a policy or control model. A large number of known training methods, such as for example reinforcement learning methods, are available to train such a policy.

However, in the case of control optimizations in the industrial environment, convergence problems and/or problems with regard to repeatability of learning processes arise in a large number of known training methods. This may for example be attributed to the fact that only a small part of a state space of the technical system is taken into consideration, that sensor data of the technical system are noisy and/or that control actions generally exhibit their effect with a time delay, with different control actions often leading to different time delays. The above symptoms commonly occur in complex real systems and may considerably impair learning success.

SUMMARY

An aspect relates to specify a control device for controlling a technical system and a method for configuring the control device, both of which enable more efficient training.

To configure a control device for a technical system, an operating signal of the technical system is fed into a first machine learning module that is trained, on the basis of an operating signal of the technical system, to reproduce a behavior signal of the technical system that arises specifically without current application of a control action and to output the reproduced behavior signal as first output signal. The first output signal is fed into a second machine learning module that is trained, on the basis of a control action signal, to reproduce a resultant behavior signal of the technical system and to output the reproduced behavior signal as second output signal. Furthermore, an operating signal of the technical system is fed into a third machine learning module and a third output signal of the third machine learning module is fed into the trained second machine learning module. A control action performance is determined on the basis of the second output signal. The third machine learning module is thereby trained to optimize the control action performance on the basis of an operating signal of the technical system. The control device is finally configured, on the basis of the third machine learning module, to control the technical system by way of a third output signal of the third machine learning module.

To carry out the method according to embodiments of the invention, provision is made for a control device, a computer program product (non-transitory computer readable storage medium having instructions, which when executed by a processor, perform actions) and a non-volatile computer-readable storage medium.

The method according to embodiments of the invention and the control device according to embodiments of the invention may be carried out or implemented for example by way of one or more computers, processors, application-specific integrated circuits (ASIC), digital signal processors (DSP) and/or field-programmable gate arrays (FPGA).

Embodiments of the invention makes it possible to configure or train a control device considerably more efficiently. Since the trained second machine learning module is used in the training of the third machine learning module, essential components of a system behavior generally no longer have to be implicitly learned or represented when training the third machine learning module. In many cases, this leads to considerably improved convergence behavior and/or to better repeatability of training results. The training additionally often becomes more stable and/or more robust to variations in the training data. Moreover, in many cases, fewer training data, less computing time and/or fewer computing resources are required.

According to one advantageous embodiment of the invention, the third machine learning module may be trained on the basis of the first output signal. This means that the third machine learning module is often able to be trained particularly effectively, since specific information about a system behavior without current application of a control action is available to the third machine learning module.

According to one particularly advantageous embodiment of the invention, the control action performance for a respective point in time may be determined in each case on the basis of a single time increment of a behavior signal. Complicated determination or estimation of future effects on performance is often not necessary. Dynamic effects running on different timescales may thus also efficiently be taken into consideration. The time increment may furthermore be of different length depending on a control action and/or a behavior signal, and also replicate effects of control actions, these effects lying further in the future.

Advantageously, first and/or second parts of an operating signal of the technical system may be selected specifically according to whether or not they comprise a control action. First parts of the operating signal that do not comprise a control action may thus be used specifically to train the first machine learning module and/or second parts of the operating signal that comprise a control action may be used specifically to train the second machine learning module. A specific selection of training data that targets a respective training objective makes it possible to train the first and/or the second machine learning module in a particularly effective manner.

According to a further advantageous embodiment of the invention, a behavior signal setpoint value may be read in and the second output signal may be compared with the behavior signal setpoint value. The control action performance may thus be determined depending on the comparison result. It is possible in particular to determine a deviation between the second output signal and the behavior signal setpoint value, for example in the form of an absolute difference or squared difference. The control action performance may then be determined depending on the deviation, with a larger deviation generally leading to a poorer control action performance.

The behavior signal setpoint value may furthermore be fed into the third machine learning module. The third machine learning module may thus be trained to optimize the control action performance on the basis of the behavior signal setpoint value.

According to a further advantageous embodiment of the invention, the control action performance may be determined on the basis of the first output signal. In this case, it is possible to determine in particular a deviation between the first output signal and the second output signal, for example in the form of an absolute difference or squared difference. As an alternative or in addition, it is possible to determine a deviation of a sum of the first and second output signal from a behavior signal setpoint value. The control action performance may then be determined depending on a deviation ascertained in this way. The deviation may in this case in particular be taken as a basis for assessing how a system behavior with application of a control action differs from the system behavior without application of this control action. It turns out that the determination of the control action performance using this difference is able to be considerably improved in many cases.

According to one advantageous development of embodiments of the invention, the first and/or the second machine learning module may be trained to separately reproduce multiple behavior signals of different processes running in the technical system. The control action performance may then be determined depending on the reproduced behavior signals. The first and/or second machine learning module may to this end in particular comprise a set of machine learning models or sub-models that each model a specific process running in the technical system in a process-specific manner. Such separate training in many cases turns out to be more efficient than combined training, since the respective underlying individual dynamics on their own generally have a simpler response behavior than combined system dynamics.

Since embodiments of the invention make it possible to determine the control action performance at a respective point in time on the basis of a single, possibly adjustable time increment of a behavior signal, fewer synchronization problems between processes with different running speeds generally occur in particular during the training of the third machine learning module. In many cases, it is possible to perform a comparatively precise and robust assessment of the control action performance in a single step for different process-specific machine learning models.

A specific behavior signal setpoint value may furthermore be read in for a respective behavior signal. The control action performance may then be determined on the basis of a comparison between the reproduced behavior signals and the specific behavior signal setpoint values.

The third machine learning module may in particular be trained to optimize the control action performance on the basis of the specific behavior signal setpoint values.

BRIEF DESCRIPTION

Some of the embodiments will be described in detail, with reference to the following figures, wherein like designations denote like members, wherein.

DETAILED DESCRIPTION

Figure 1:
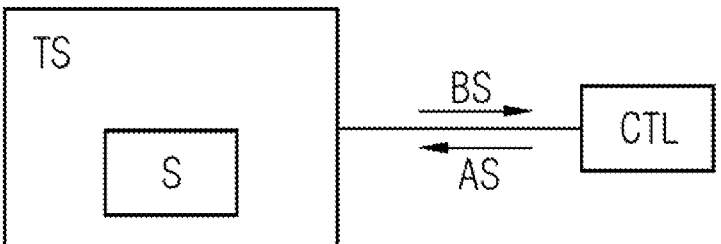
FIG. 1 shows a gas turbine with a control device according to embodiments of the invention.

FIG. 1 illustrates a gas turbine as technical system TS with a control device CTL by way of example. As an alternative or in addition, the technical system TS may also comprise a wind turbine, a combustion engine, a manufacturing installation, a chemical, metallurgical or pharmaceutical production process, a robot, a motor vehicle, an energy transmission grid, a 3D printer or another machine, another device or another installation.

The gas turbine TS is coupled to the control device CTL, which may be implemented as part of the gas turbine TS or be implemented fully or partly externally to the gas turbine TS. In FIG. 1, the control device CTL is illustrated as being external to the technical system TS for the sake of clarity.

The control device CTL is used to control the technical system TS and, for this purpose, is trained by way of a machine learning method. To control the technical system TS should also be understood to mean here to regulate the technical system TS and to output and to use data or signals that are control-relevant, that is to say that contribute to controlling the technical system TS.

Such control-relevant data or signals may in particular comprise control action signals, forecast data, monitoring signals, state data and/or classification data that may be used in particular for operational optimization, monitoring or maintaining the technical system TS and/or for recognizing wear or damage.

The gas turbine TS has sensors S that continuously measure one or more operating parameters of the technical system TS and output them as measured values. The measured values from the sensors S and possibly operating parameters of the technical system TS that are captured in another way are transmitted from the technical system TS to the control device CTL as operating signals BS.

The operating signals BS may in particular comprise physical, chemical, regulation-related, effect-related and/or design-related operating variables, property data, performance data, effect data, state signals, behavior signals, system data, preset values, control data, control action signals, sensor data, measured values, surroundings data, monitoring data, forecast data, analysis data and/or other data accrued during operation of the technical system TS and/or describing an operating state or a control action of the technical system TS. These may be for example data regarding temperature, pressure, emissions, vibrations, oscillating states or resource consumption of the technical system TS. Specifically in the case of a gas turbine, the operating signals BS may concern a turbine power, a rotational speed, vibration frequencies, vibration amplitude, combustion dynamics, combustion alternating pressure amplitudes or nitrous oxide concentrations.

On the basis of the operating signals BS, the trained control device CTL determines control actions that optimize a performance of the technical system TS. The performance to be optimized may in this case in particular concern a power, a yield, a speed, a service life, a precision, an error rate, a resource demand, an efficiency, a pollutant output, a stability, a wear, a lifetime and/or other target parameters of the technical system TS.

The determined performance-optimized control actions are brought about by the control device CTL by transmitting appropriate control action signals AS to the technical system TS. The control actions may be used, for example in the case of a gas turbine, to set a gas supply, a gas distribution or an air supply.

Figure 2:
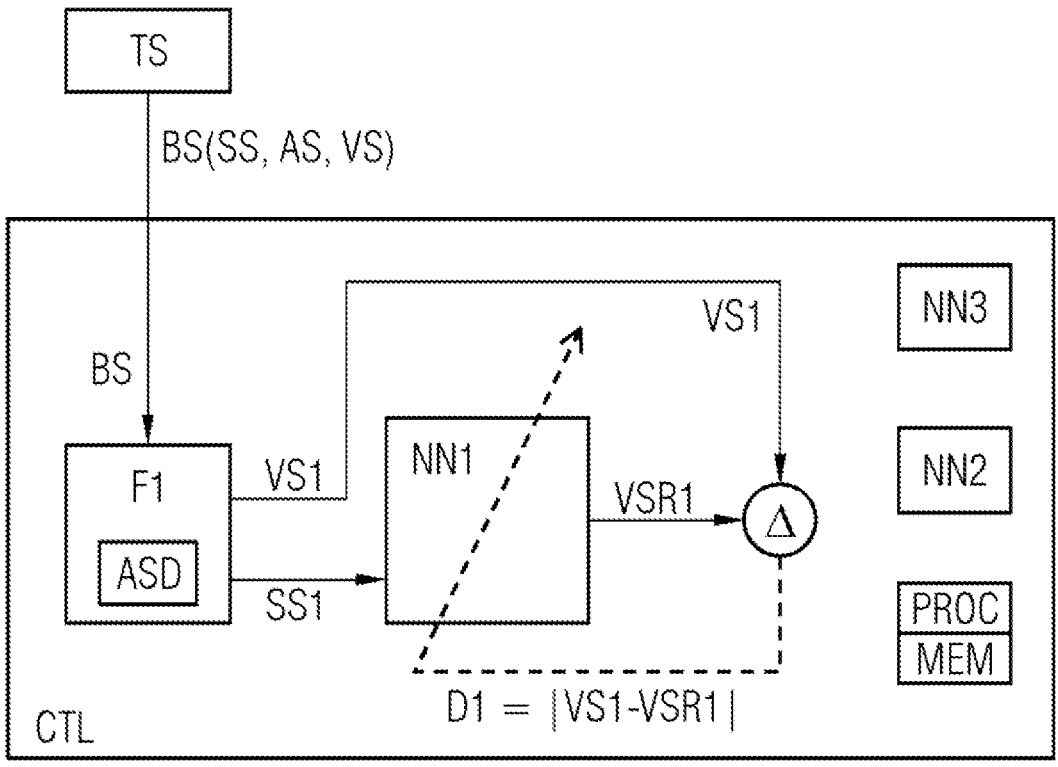
FIG. 2 shows a control device according to embodiments of the invention in a first training phase.

FIG. 2 shows a schematic illustration of a learning-based control device CTL according to embodiments of the invention in a first training phase. The control device CTL is intended to be configured to control a technical system TS. Where the same or corresponding reference signs are used in the figures, these reference signs denote the same or corresponding entities.

In the present exemplary embodiment, the control device CTL is coupled to the technical system TS. The control device CTL comprises one or more processors PROC for carrying out the method according to embodiments of the invention and one or more memories MEM for storing method data.

The control device CTL receives operating signals BS from the technical system TS as training data. The operating signals contain in particular timeseries, that is to say temporal sequences of values of operating parameters of the technical system TS. In the present exemplary embodiment, the operating signals BS contain state signals SS specifying states of the technical system TS over the course of time, control action signals AS specifying or bringing about control actions of the technical system TS and behavior signals VS specifying a system behavior of the technical system TS. The behavior signals may for example specify changes of combustion alternating pressure amplitudes, emissions, a speed or a temperature of a gas turbine. State signals of the technical system that are relevant in particular to a performance of the technical system TS may be captured as behavior signals VS.

At least some of the operating signals BS may also be received or originate from a technical system similar to the technical system TS, from a database containing stored operating signals of the technical system TS or of a technical system similar thereto and/or from a simulation of the technical system TS or of a technical system similar thereto.

The control device CTL furthermore comprises a first machine learning module NN1, a second machine learning module NN2 and a third machine learning module NN3. A respective machine learning module NN1, NN2 or NN3 may in this case in particular be designed as an artificial neural network or as a set of neural subnetworks. The first machine learning module NN1 may in particular be designed as a submodule of the third machine learning module NN3.

The machine learning modules NN1, NN2 and/or NN3 may use or implement a supervised learning method, a reinforcement learning method, a recurrent neural network, a convolutional neural network, a Bayesian neural network, an autoencoder, a deep learning architecture, a support vector machine, a data-driven trainable regression model, a k-nearest neighbor classifier, a physical model, a decision tree and/or a random forest. A large number of efficient implementations are available for the indicated variants and the training thereof.

Training should be understood here generally to mean optimization of mapping of input signals onto output signals. This mapping is optimized in accordance with criteria that are predefined, learned and/or to be learned during a training phase. In this case, for example, a prediction error may be used as criterion in prediction models, a classification error may be used as criterion in classification models or success of a control action may be used as criterion in control models. The training makes it possible for example to set or optimize networking structures of neurons of the neural network and/or weights of connections between the neurons such that the predefined criteria are satisfied as well as possible. The training may thus be understood as an optimization problem. A large number of efficient optimization methods are available for such optimization problems in the field of machine learning. Gradient descent methods, particle swarm optimizations and/or genetic optimization methods may in particular be used.

In the first training phase illustrated by FIG. 2, the first machine learning module NN1 is trained. This is intended to be trained, on the basis of an operating signal of the technical system TS, to predict or to reproduce a behavior of the technical system TS that would develop without current application of a control action.

To improve training success, the training data BS are filtered by a filter F1 coupled to the first machine learning module NN1 in order to obtain training data without a control action or without effects of a control action. For this purpose, the operating signals BS are fed into the filter F1. The filter F1 comprises a control action detector ASD for detecting control actions in the operating signals BS on the basis of control action signals AS contained therein.

Depending on the detection of control actions by the control action detector ASD, first parts of the operating signals BS are selected by the filter F1 and extracted from the operating signals BS. In this case, first parts of the operating signals BS that do not contain any control action and/or any effects of a control action are selected. The first parts of the operating signals BS may thus for example be extracted from a time window following a detected current control action, wherein the time window is selected such that this control action is not yet able to affect a system behavior.

The filtered first parts of the operating signals BS comprise first parts SS1 of the state signals SS and first parts VS1 of the behavior signals VS. The first parts SS1 and VS1 are output by the filter F1 and used to train the first machine learning module NN1.

The first parts SS1 of the state signals SS are fed into the first machine learning module NN1 as input signal for training purposes. The purpose of the training is for the first machine learning module NN1, on the basis of an operating signal of the technical system TS, to reproduce a behavior signal of the technical system that arises without current application of a control action as well as possible. In other words, an output signal VSR1 of the first machine learning module NN1, referred to hereinafter as first output signal, matches the actual behavior signal of the technical system TS as well as possible. For this purpose, a deviation D1 between the first output signal VSR1 and the corresponding first parts VS1 of the behavior signals VS is determined. The deviation D1 in this case represents a reproduction or prediction error of the first machine learning module NN1. The deviation D1 may in particular be calculated as the square or absolute value of a difference, in particular a vector difference, according to $D1=(VS1-VSR1)_2$ or $D1=|VS1-VSR1|$.

The deviation D1, as indicated in FIG. 2 by a dashed arrow, is fed back to the first machine learning module NN1. On the basis of the fed-back deviation D1, the first machine learning module NN1 is trained to minimize this deviation D1 and thus the reproduction error. As already indicated above, a large number of optimization methods, such as for example gradient descent methods, particle swarm optimizations or genetic optimization methods, are available to minimize the deviation D1. The first machine learning module NN1 is thereby trained by a supervised learning method. The trained first machine learning module NN1 reproduces, with the first output signal VSR1, a behavior signal of the technical system TS as would arise without current application of a control action.

Since the filtered operating signals SS1 and VS1 are used for training purposes, the first machine learning module NN1 is trained particularly effectively with regard to this training objective. It should also be pointed out that the first machine learning module NN1 may also be trained outside of the control device CTL.

The above training method may particularly advantageously be used to separately reproduce multiple behavior signals of different processes running in the technical system TS. For this purpose, the first machine learning module NN1 may comprise multiple process-specific neural subnetworks that are each trained separately or individually with process-specific behavior signals, as described above. Such separate training in many cases turns out to be more efficient than combined training, since the respective underlying individual dynamics on their own generally have a simpler and/or more uniform response behavior.

Figure 3:
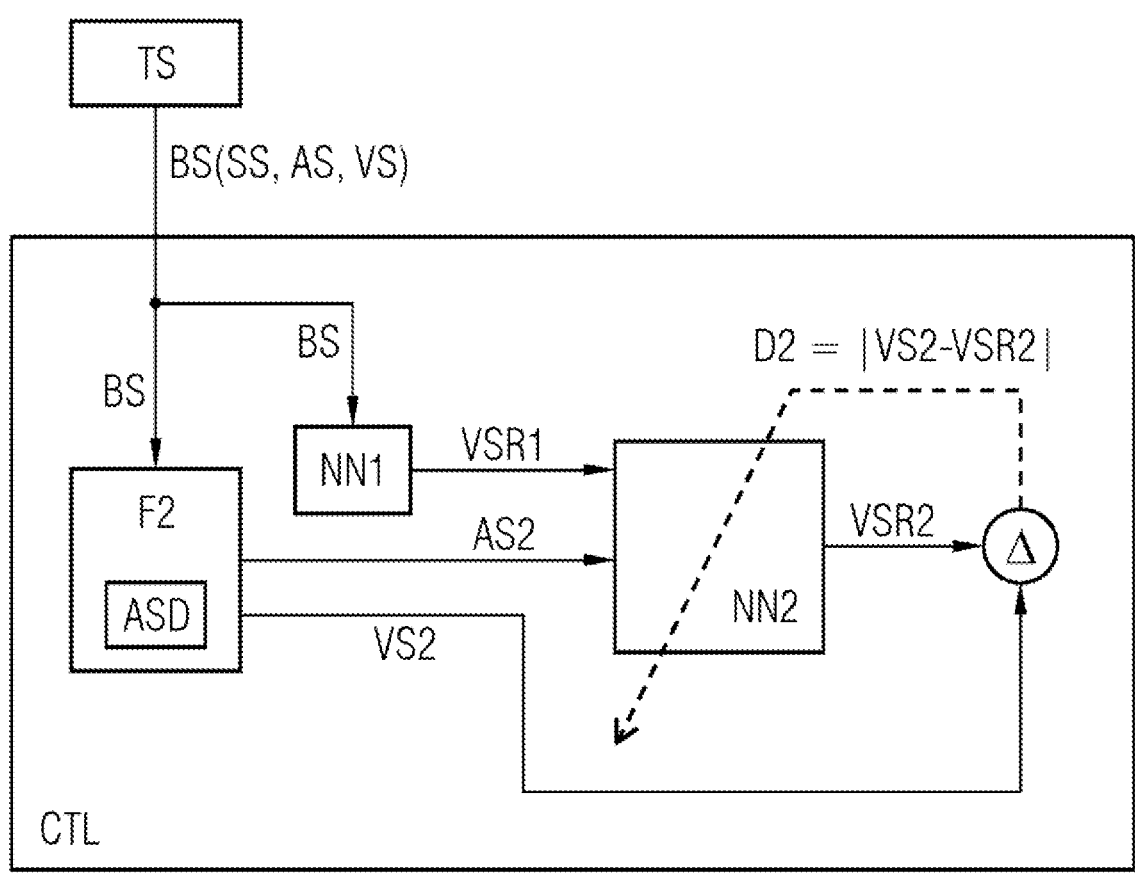
FIG. 3 shows the control device in a second training phase.

FIG. 3 illustrates the control device CTL in a second training phase. In the second training phase, the second machine learning module NN2 is intended to be trained, on the basis of an operating signal BS of the technical system TS, and in particular on the basis of a control action signal AS contained therein, to predict or to reproduce a behavior of the technical system TS that is induced by a respective control action.

To train the second machine learning module NN2, the control device CTL receives operating signals BS of the technical system TS from the technical system TS as training data. As already mentioned above, the operating signals BS in particular contain timeseries of state signals SS, control action signals AS and behavior signals VS. The trained first machine learning module NN1 is additionally used to train the second machine learning module NN2. In the present exemplary embodiment, the training of the first machine learning module NN1 is already complete when training the second machine learning module NN2.

To improve training success, the training data BS are filtered by a filter F2 coupled to the second machine learning module NN2 in order to obtain training data that contain control actions or effects of control actions.

For this purpose, the operating data BS are fed into the filter F2. The filter F2 contains a control action detector ASD for specifically detecting control actions in the operating signals BS on the basis of control action signals AS contained therein. Depending on the detection of control actions by the control action detector ASD, second parts of the operating signals BS are selected by the filter F2 and extracted from the operating signals BS. In this case, second parts of the operating signals BS that comprise control actions and/or effects of control actions are selected. By way of example, the second parts of the operating signals BS may be extracted from a time window around a respectively detected control action and/or from a time window in which an effect of the respective control action should be expected. The filtered second parts of the operating signals BS comprise in particular second parts VS2 of the behavior signals VS and second parts AS2 enriched with control action signals. The second parts AS2 and VS2 of the operating signals BS are output by the filter F2 and used to train the second machine learning module NN2.

For the training, the second parts AS2 of the operating signals BS are fed into the second machine learning module NN2 as input signal. The operating signals BS are also fed into the already trained first machine learning module NN1, which derives a behavior signal VSR1 therefrom and outputs it as first output signal. The behavior signal VSR1, as described above, reproduces a behavior signal of the technical system TS as would arise without current application of a control action. The behavior signal VSR1 is fed into the second machine learning module NN2 as further input signal.

The purpose of the training is for the second machine learning module NN2, on the basis of an operating signal containing control actions, here AS2, and on the basis of a behavior signal that arises without current application of a control action, here VSR1, to reproduce a behavior signal of the technical system TS that is induced by the control actions as accurately as possible. In other words, an output signal VSR2 of the second machine learning module NN2, hereinafter referred to as second output signal, matches the actual behavior signal of the technical system TS under the influence of control actions as well as possible.

In the course of the training, a deviation D2 between the second output signal VSR2 and the corresponding second parts VS2 of the behavior signals VS is determined. The deviation D2 in this case represents a reproduction or prediction error of the second machine learning module NN2. The deviation D2 may for example be calculated as the square or absolute value of a difference, in particular a vector difference, according to $D2=(VS2-VSR2)^2$ or $D2=|VS2-VSR2|$.

The deviation D2, as indicated in FIG. 3 by a dashed arrow, is fed back to the second machine learning module NN2. On the basis of the fed-back deviation D2, the second machine learning module NN2 is trained to minimize this deviation D2 and thus the reproduction error. A large number of known optimization methods, in particular supervised learning methods, may be used to minimize the deviation D2, as already mentioned above.

The trained second machine learning module NN2 reproduces, with the second output signal VSR2, a behavior signal of the technical system TS that is induced by current application of a control action.

Since the filtered operating signals AS2 and VS2 are used for training purposes, the second machine learning module NN2 is trained particularly effectively with regard to this training objective. Furthermore, feeding the behavior signal VSR1 into the second machine learning module NN2 also makes it possible to considerably increase training success in many cases, since specific information about a difference between a control action-induced system behavior and a control action-free system behavior is available to the second machine learning module NN2. It should also be pointed out that the second machine learning module NN2 may also be trained outside of the control device CTL.

The above training method may particularly advantageously be used to separately reproduce multiple behavior signals of different processes running in the technical system TS. For this purpose, the second machine learning module NN2, like the first machine learning module NN1, may comprise multiple process-specific neural subnetworks that are each trained separately or individually with process-specific behavior signals, as described above.

Figure 4:
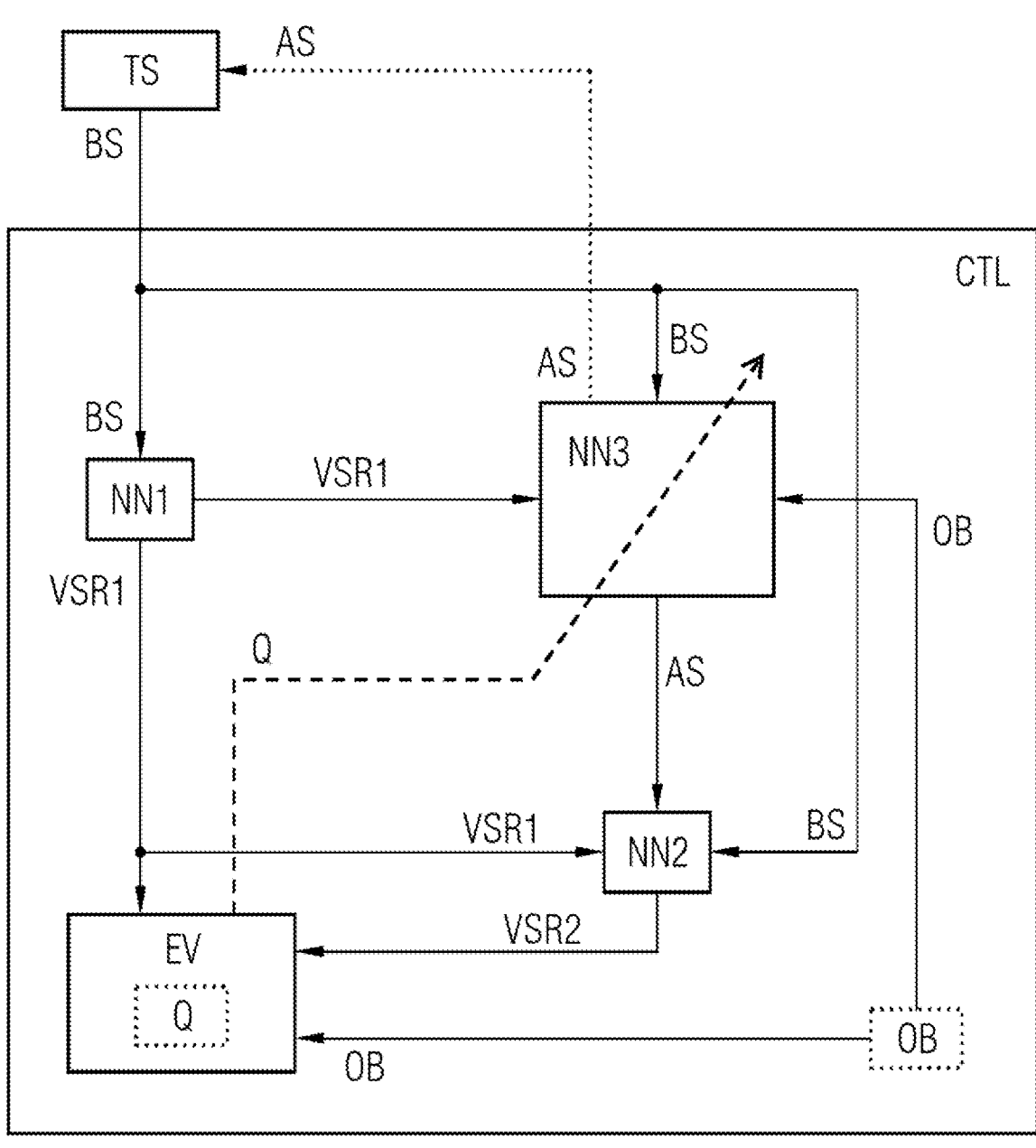
FIG. 4 shows the control device in a third training phase.

FIG. 4 illustrates the control device CTL in a third training phase. In the third training phase, the third machine learning module NN3 is intended to be trained, on the basis of an operating signal of the technical system TS, to generate a performance-optimizing control action signal for controlling the technical system. Optimize should in this case also be understood to mean approach an optimum. As a result of training the third machine learning module NN3, the control device CTL is configured to control the technical system TS.

To train the third machine learning module NN3, the control device CTL receives operating signals BS of the technical system TS from the technical system TS as training data. For this training, the first machine learning module NN1 and the second machine learning module NN2 are used, these having been trained, as described above. In the present exemplary embodiment, the training of the machine learning modules NN1 and NN2 is already complete when the third machine learning module NN3 is trained.

In addition to the components described above, the control device CTL comprises a performance assessor EV that is coupled to the machine learning modules NN1, NN2 and NN3. Furthermore, the first machine learning module NN1 is coupled to the machine learning modules NN2 and NN3 and the second machine learning module NN2 is coupled to the third machine learning module NN3.

The performance assessor EV is used, for a respective control action, to determine a performance of the behavior of the technical system TS that is triggered by this control action. For this purpose, a reward function Q is evaluated. The reward function Q determines and quantifies a reward, here the performance of a current system behavior, as already mentioned multiple times. Such a reward function is often also referred to as a cost function, loss function, objective function or value function. The reward function Q may for example be implemented as a function of an operating state, a control action and one or more setpoint values OB for a system behavior.

If multiple behavior signals are evaluated by the machine learning modules NN1, NN2, NN3 and/or by the performance assessor EV, multiple behavior signal setpoint values OB may each be predefined specifically for a respective behavior signal.

To train the third machine learning module NN3, the operating signals BS are fed into the trained machine learning modules NN1 and NN2 and into the third machine learning module NN3 as input signals.

On the basis of the operating signals BS, the trained first machine learning module NN1 reproduces a behavior signal VSR1 of the technical system TS as would arise without current application of a control action. The reproduced behavior signal VSR1 is fed by the first machine learning module NN1 into the second machine learning module NN2, into the third machine learning module NN3 and into the performance assessor EV. One or more behavior signal setpoint values OB are also fed into the third machine learning module NN3 and into the performance assessor EV.

An output signal AS, resulting from the operating signals BS, the reproduced behavior signals VSR1 and the one or more behavior signal setpoint values OB, of the third machine learning module NN3, hereinafter referred to as third output signal, is furthermore fed into the trained second machine learning module NN2 as input signal. On the basis of the third output signal AS, the reproduced behavior signal VSR1 and the operating signals BS, the trained second machine learning module NN2 reproduces a control action-induced behavior signal VSR2 of the technical system TS, which is fed into the performance assessor EV by the trained second machine learning module NN2.

The performance assessor EV quantifies a current performance of the technical system TS on the basis of the reproduced behavior signal VSR2, taking into consideration the reproduced first behavior signal VSR1 and the one or more behavior signal setpoint values OB. The performance assessor EV in this case ascertains in particular a first deviation of the control action-induced behavior signal VSR2 from the one or more behavior signal setpoint values OB. In the case of an increasing deviation, a reduced control action performance is generally determined in this case. A second deviation between the control action-induced behavior signal VSR2 and the behavior signal VSR1 is also determined. On the basis of the second deviation, the performance assessor EV is able to assess how a system behavior with application of a control action differs from the system behavior without application of this control action. It turns out that the performance assessment using this difference is able to be considerably improved in many cases.

The control action performance determined using the reward function Q, as indicated by a dashed arrow in FIG. 4, is fed back to the third machine learning module NN3. On the basis of the fed-back control action performance, the third machine learning module NN3 is trained to maximize the control action performance. A large number of known optimization methods may be used to maximize the control action performance, as mentioned multiple times above.

Since the second machine learning module NN2 in particular expects a control action signal as input signal, as it were, the third machine learning module NN3 is implicitly trained to output such a control action signal, here AS. By optimizing the control action performance, the third machine learning module NN3 is thus trained to output a performance-optimizing control action signal AS.

Since, in addition to the operating signal BS, the reproduced behavior signal VSR1 is also used to train the third machine learning module NN3, the latter is able to be trained particularly effectively since specific information about a control action-free system behavior is available to the third machine learning module NN3.

One particular advantage of embodiments of the invention is the fact that, when training the third machine learning module NN3, it is sufficient in many cases to evaluate in each case only a single, possibly adjustable time increment of the behavior signals using the performance assessor EV for a respective point in time. Complex determination or estimation of future rewards is often not necessary. Effects that run on different timescales may thus also be efficiently taken into consideration.

Furthermore, a predefined dataset of operating signals may be used multiple times to train the third machine learning module NN3, since varying behavior signal setpoint values OB are predefined for the behavior signal VSR2. This makes it possible to learn different, setpoint value-specific control action signals from the same operating signals and thus to achieve better coverage of a control action space.

Through the training of the third machine learning module NN3, the control device CTL is configured to control the technical system TS by way of the control action signal AS of the trained third machine learning module NN3 in a performance-optimizing manner.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for controlling a technical system, said method comprising:

a) feeding a first operating signal of the technical system into a first machine learning module that is trained, on the basis of the first operating signal of the technical system, to reproduce a behavior signal of the technical system that arises specifically without current application of a control action and to output the reproduced behavior signal as a first output signal;

b) feeding the first output signal into a second machine learning module that is trained, on the basis of a control action signal, to reproduce a resultant behavior signal of the technical system and to output the reproduced resultant behavior signal as a second output signal;

c) feeding a second operating signal of the technical system into a third machine learning module;

d) feeding a third output signal of the third machine learning module into the trained second machine learning module, wherein a control device comprises the first machine learning module, the second machine learning module, and the third machine learning module;

e) training the third machine learning module to optimize a control action performance on the basis of a third operating signal of the technical system; and f) using the control device, on the basis of the trained third machine learning module, to control the technical system by way of a using, in a performance optimizing manner, the third output signal of the third machine learning module, wherein the control of the technical by the control device optimizes a performance of the technical system.

2. The method as claimed in claim 1, wherein the third machine learning module is trained on the basis of the first output signal.

3. The method as claimed in claim 1, wherein the control action performance is determined for a respective point in time in each case on the basis of a single time increment of a behavior signal.

4. The method as claimed in claim 1, wherein first and/or second parts of an operating signal of the technical system are selected specifically according to whether or not they comprise a control action, and in that first parts of the operating signal that do not comprise a control action are used specifically to train the first machine learning module and/or second parts of the operating signal that comprise a control action are used specifically to train the second machine learning module.

5. The method as claimed in claim 1, wherein a behavior signal setpoint value is read in, in that the second output signal is compared with the behavior signal setpoint value, and in that the control action performance is determined depending on the comparison result.

6. The method as claimed in claim 5, wherein the behavior signal setpoint value into the third machine learning module, and

in that the third machine learning module is trained to optimize the control action performance on the basis of the behavior signal setpoint value.

7. The method as claimed in claim 1, wherein the control action performance is determined on the basis of the first output signal.

8. The method as claimed in claim 7, wherein a deviation between the first output signal and the second output signal is determined, and in that the control action performance is determined depending on the deviation.

9. The method as claimed in claim 1, wherein the first and/or the second machine learning module is trained to separately reproduce multiple behavior signals of different processes running in the technical system, and in that the control action performance is determined depending on the reproduced behavior signals.

10. The method as claimed in claim 9, wherein a specific behavior signal setpoint value is read in for a respective behavior signal, and in that the control action performance is determined on the basis of a comparison between the reproduced behavior signals and the specific behavior signal setpoint values.

11. The method as claimed in claim 10, wherein the third machine learning module is trained to optimize the control action performance on the basis of the specific behavior signal setpoint values.

12. A control device for controlling a technical system, configured to carry out the method as claimed in claim 1.

13. A computer program product, comprising a non-transitory computer readable hardware storage device having computer readable program code stored therein, said program code executable by a processor of a computer system to implement a method configured to carry out the method as claimed in claim 1.

14. A non-transitory computer-readable storage medium containing the computer program product as claimed in claim 13.

15. The method as claimed in claim 1, wherein the technical system comprises a wind turbine, wherein said using the control device to control the technical system comprises using the control device to control one or more parameters of the wind turbine, and wherein the one or more parameters are selected from the group consisting of a turbine power, a rotational speed, vibration frequencies, vibration amplitude, combustion dynamics, combustion alternating pressure amplitudes, nitrous oxide concentrations, and combinations thereof.

16. The method as claimed in claim 1, wherein the technical system comprises hardware or a process, wherein the hardware is selected from the group consisting of a combustion engine, a chemical, a robot, a motor vehicle, an energy transmission grid, and a 3D printer, wherein the process is selected from the group consisting of a manufacturing installation and a chemical, metallurgical or pharmaceutical production process, wherein said using the control device to control the technical system comprises using the control device to control one or more parameters of the hardware or of the process, and wherein the one or more parameters are selected from the group consisting of a power, a yield, a speed, a service life, a precision, an error rate, a resource demand, an efficiency, a pollutant output, a stability, a wear, a lifetime, and combinations thereof.

* * * * *